Nov. 10, 1936. A. SMITH Re. 20,167

BOOKKEEPING MACHINE

Original Filed April 26, 1924 9 Sheets-Sheet 1

Inventor
Abraham Smith
By Pearl Brust
His Attorney

Nov. 10, 1936. A. SMITH Re. 20,167

BOOKKEEPING MACHINE

Original Filed April 26, 1924 9 Sheets-Sheet 2

Inventor
Abraham Smith
By
Pearl Beust
His Attorney

Nov. 10, 1936. A. SMITH Re. 20,167

BOOKKEEPING MACHINE

Original Filed April 26, 1924 9 Sheets-Sheet 3

Inventor
Abraham Smith
By Pearl Brent
His Attorney

Nov. 10, 1936. A. SMITH Re. 20,167

BOOKKEEPING MACHINE

Original Filed April 26, 1924 9 Sheets-Sheet 4

Inventor
Abraham Smith
By Earl Benst
His Attorney

BOOKKEEPING MACHINE

Original Filed April 26, 1924 9 Sheets-Sheet 5

Inventor
Abraham Smith

By Earl Benst

His Attorney

BOOKKEEPING MACHINE
Original Filed April 26, 1924 9 Sheets-Sheet 6
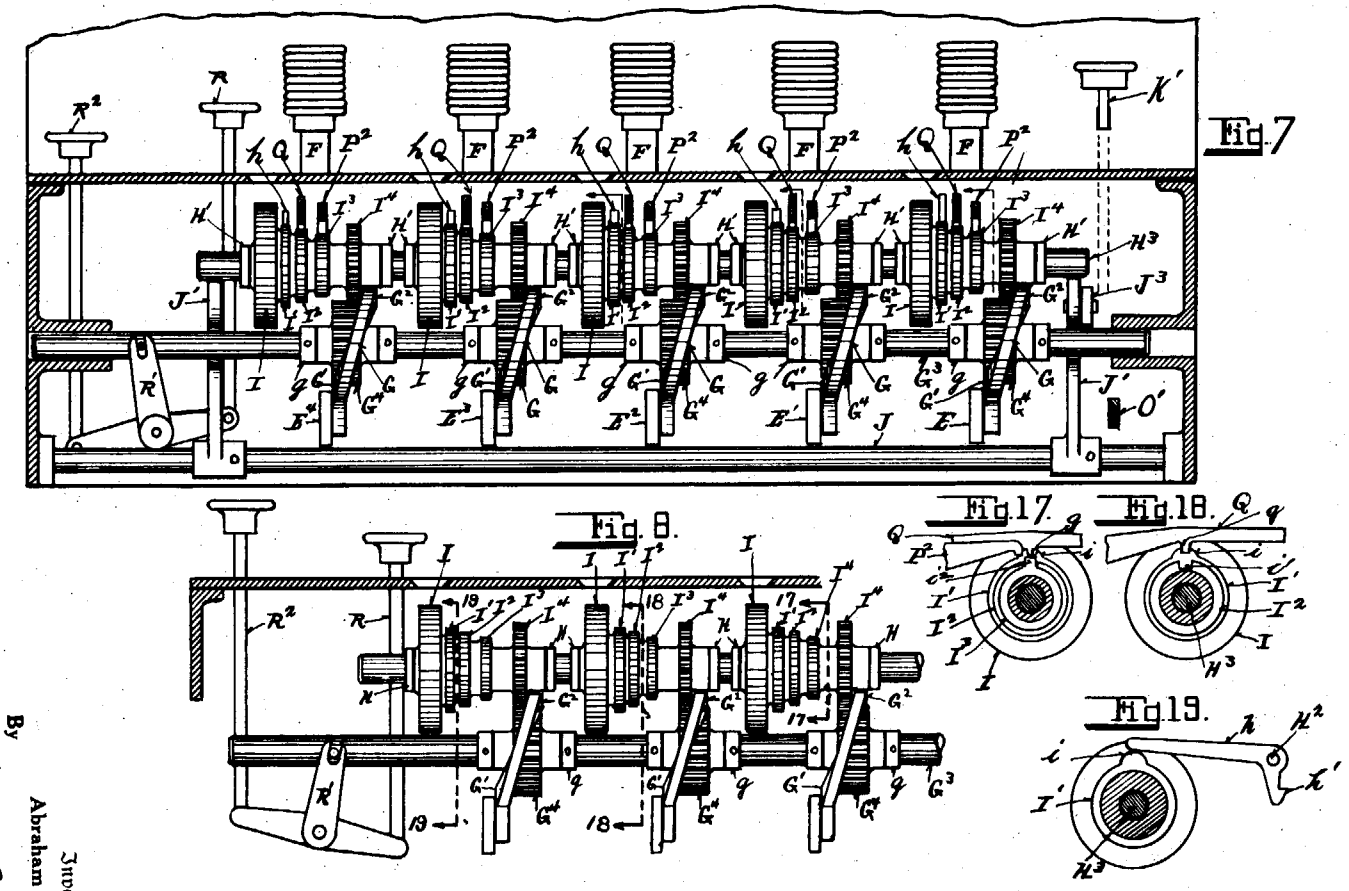
Inventor
Abraham Smith
By
Karl Beust
His Attorney

BOOKKEEPING MACHINE

Original Filed April 26, 1924 9 Sheets-Sheet 7

Inventor
Abraham Smith
By
Pearl Benst
His Attorney

Nov. 10, 1936. A. SMITH Re. 20,167

BOOKKEEPING MACHINE

Original Filed April 26, 1924 9 Sheets-Sheet 8

Inventor
Abraham Smith
By
Kearl Benst
His Attorney

Nov. 10, 1936. A. SMITH Re. 20,167

BOOKKEEPING MACHINE

Original Filed April 26, 1924 9 Sheets-Sheet 9

Inventor
Abraham Smith

By
Pearl Benedict

His Attorney

Reissued Nov. 10, 1936 Re. 20,167

UNITED STATES PATENT OFFICE 20,167

BOOKKEEPING MACHINE

Abraham Smith, Erie, Pa., assignor to The National Cash Register Company, a corporation of Maryland Original No. 1,685,685, dated September 25, 1928, Serial No. 709,180, April 26, 1924. Application for reissue March 9, 1935, Serial No. 10,327

17 Claims. (Cl. 101—102)

This invention relates to adding and recording machines, although it will be understood that some of the features of the invention can be used on adding machines which are not provided with recording mechanism.

While I have shown and described my invention particularly with reference to that type of machines in which there is a separate series of keys for each adding wheel, it will be obvious that some of the features can be utilized in adding machines using one series of keys only for all the adding wheels, and it will therefore be understood that while my invention as illustrated and described is embodied in a machine having several series of keys, I do not wish to be restricted to the use of some of the features in any special class of machines.

The objects of this invention are to provide mechanism to add, and to direct subtraction: to provide mechanism adapted to record items, totals, and remainders in several columns, without the use of a movable paper carriage: and to provide in such a machine mechanism which will be easily operated with a minimum of effort on the part of the operator.

The invention will be fully described hereinafter, reference being had to the accompanying drawings, in which:

Figure 1 is a sectional side elevation of the front end portion of my machine with the right hand plate of the frame removed.

Figure 2 is a sectional side elevation of the rear end portion of my machine, with the right hand plate of the frame removed.

Figure 3 is a sectional plan view of the front end portion of my machine, with a portion thereof broken away, thus eliminating one or more series of keys and associated adding wheels.

Figure 4 is a sectional plan view of the rear portion of my machine, with a portion thereof broken away.

Figure 7 is a transverse sectional elevation of the front portion of my machine, showing the adding wheel mechanism, in adding position.

Figure 8 is a like view of a portion of the same, showing the mechanism in subtracting position.

Figure $9^A$ is a fragment of the left hand side plate.

Figure 4:
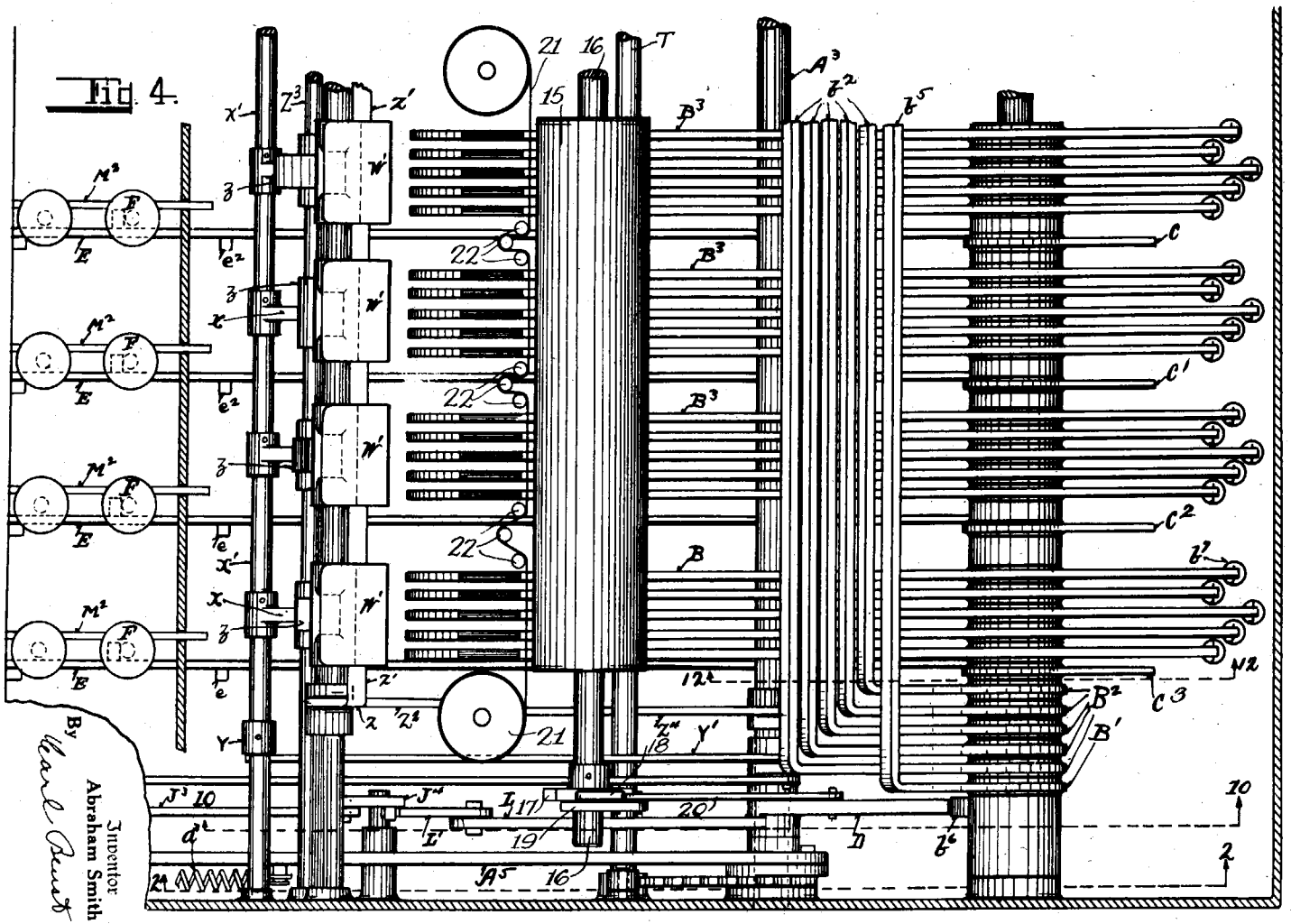
Figure 10:
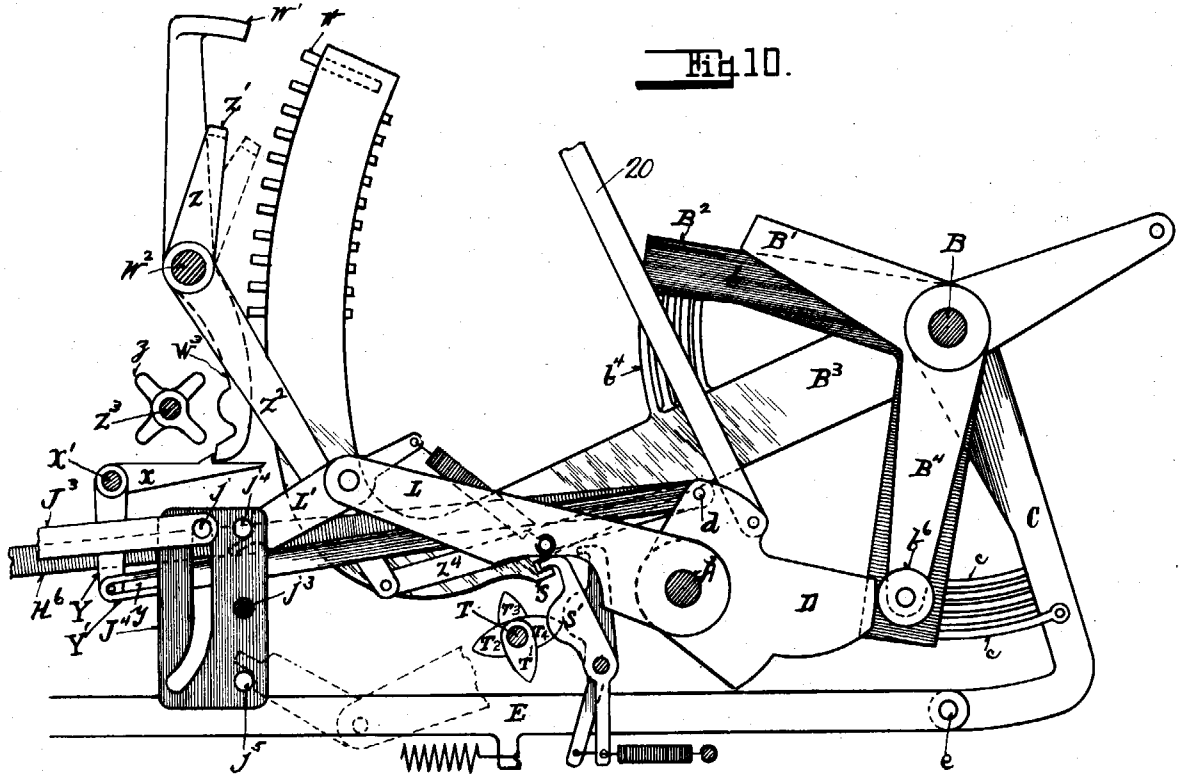

Figure 10 is a sectional elevation of the recording mechanism on the line 10—10 in Fig. 4.

Figure 11:
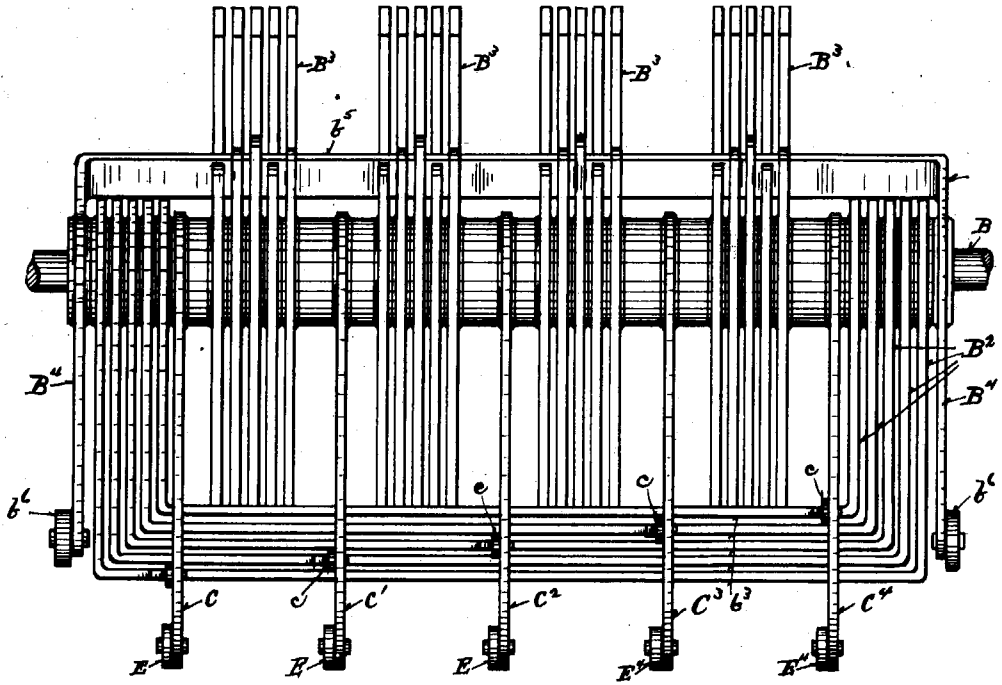

Figure 11 is a rear view of the recording mechanism.

Figures 9, 9A, 12:
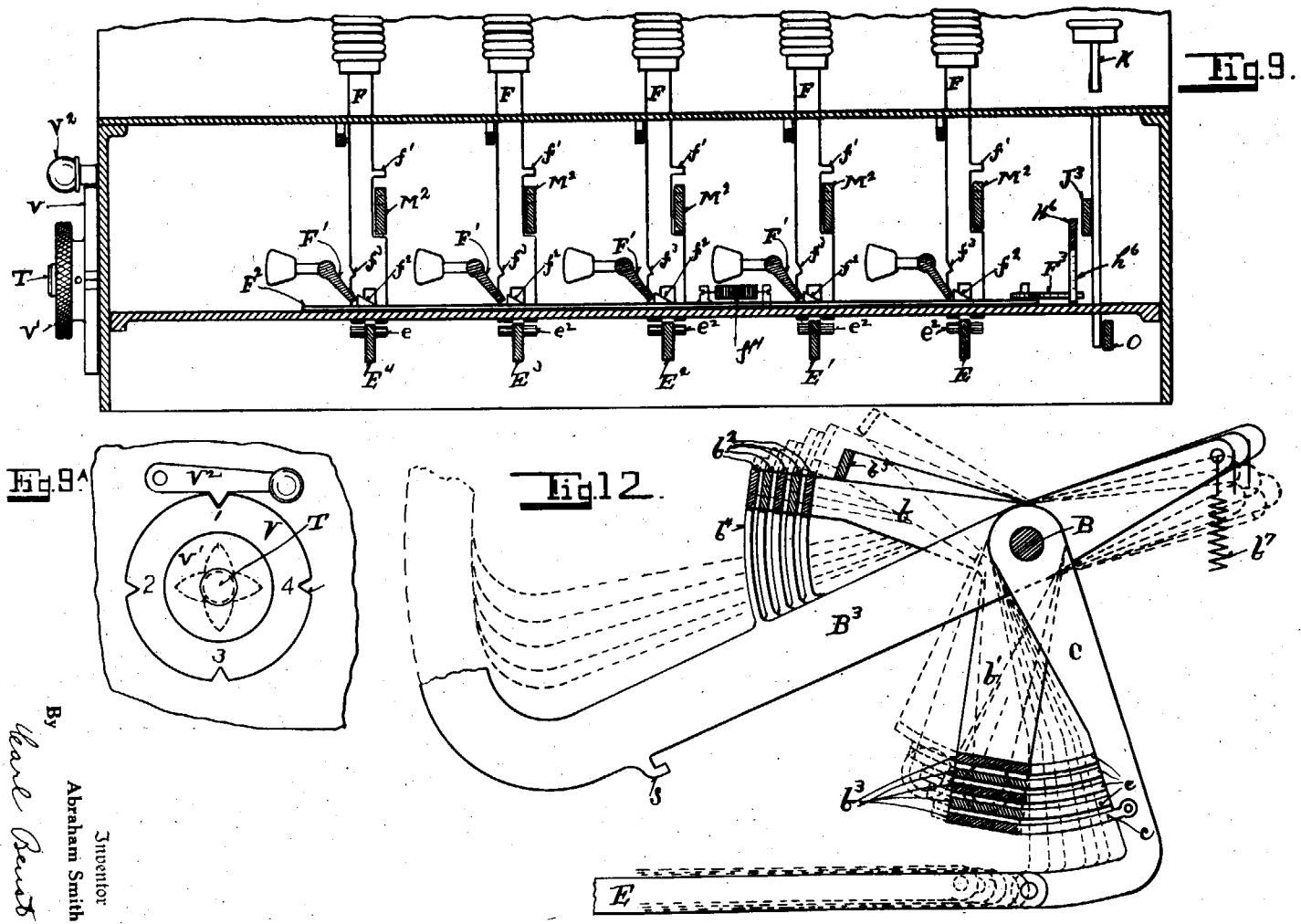
Figure 9 is a transverse section of the keyboard mechanism on the line 9—9 in Fig. 3.

Figure 12 is a sectional elevation of the recording mechanism on the line 12—12 in Fig. 4.

Figure $12^A$ is an elevation of one of the selective cam-shafts of my invention.

Figure 13 is an end view of the same.

Figure 14 is a front view of the zero controlling mechanism of my invention.

Figure 15 is a plan view of the same.

Figure 16 is a sectional side view of the same.

Figure 17 is a transverse section of one of the adding wheel mechanisms on the line 17—17 in Fig. 8.

Figure 18 is a like section on the line 18—18 in Fig. 8.

Figure 19 is a like section on the line 19—19 in Fig. 8.

In these drawings A indicates the frame of the machine in which is mounted a rock-shaft $A^1$ which may be operated by a hand crank, or motor mechanism, (not shown) in the usual manner.

Figure 1:
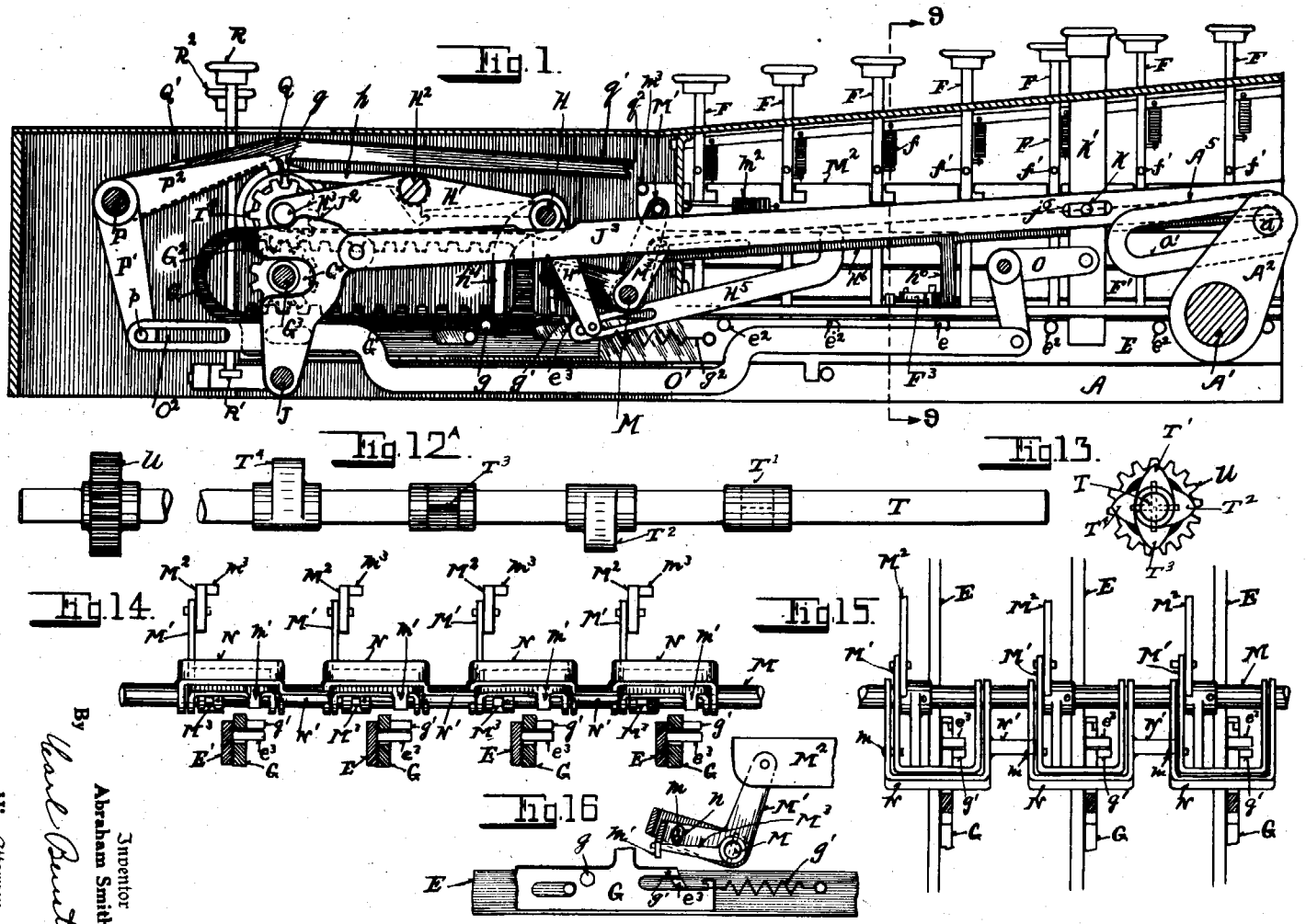
Figs. 1, 2, 3 and 4 are separate views of the front and rear portions of an adding and recording machine embodying my invention, viz.

Upon the rock-shaft $A^1$ is secured a lever $A^2$, see Fig. 1, which carries a wrist-pin post, $a$.

Figure 2:
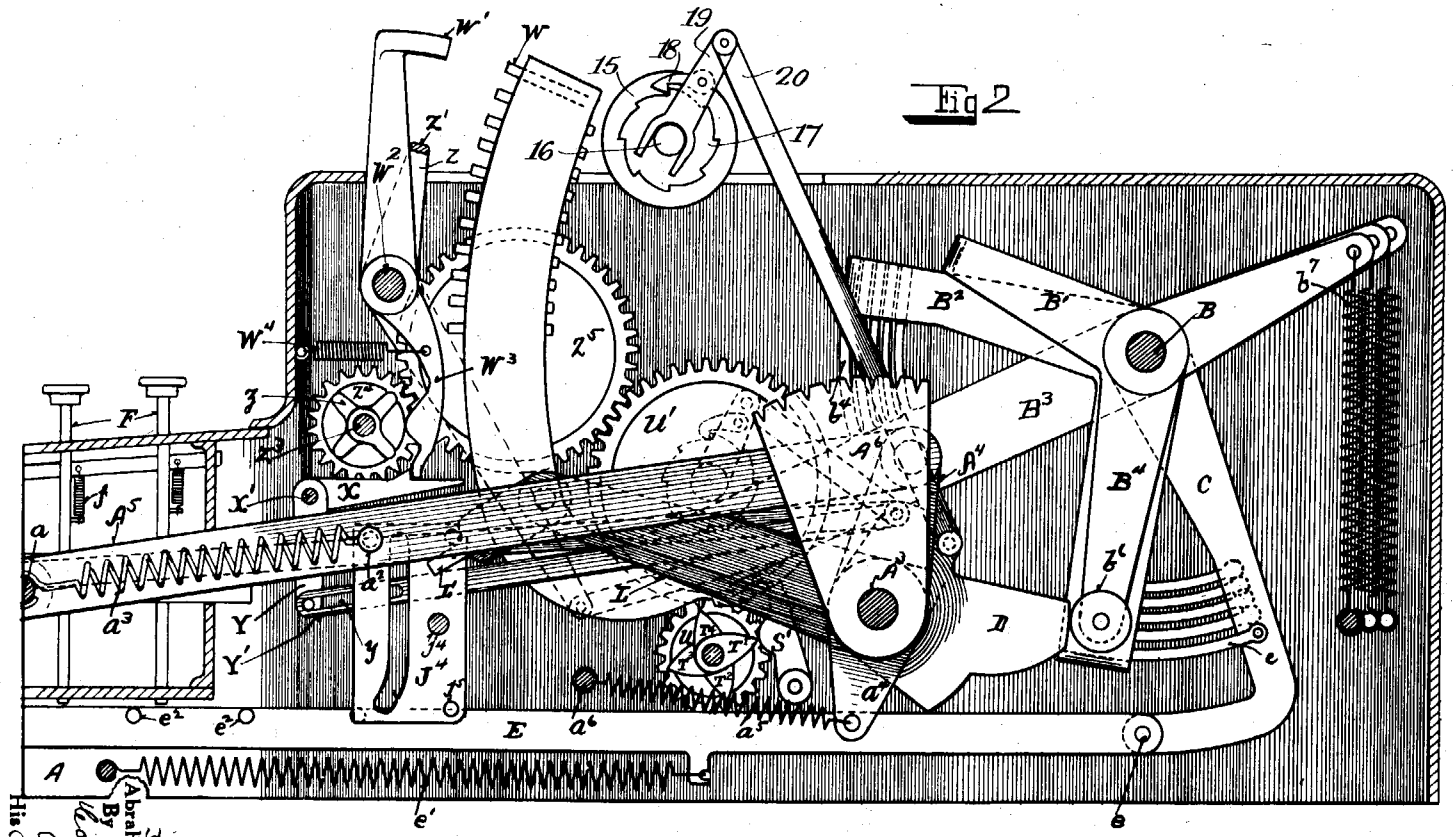
Figure 5:
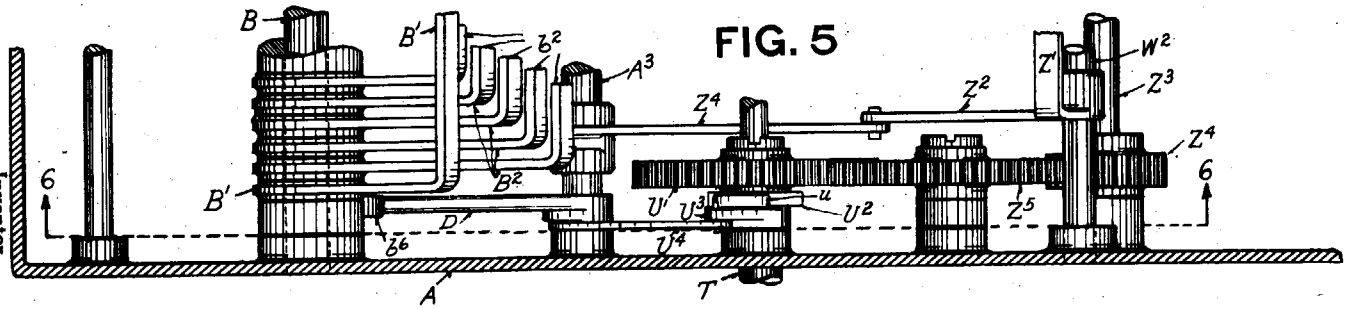
Figure 5 is a sectional plan view of the rear portion of the left hand side plate and mechanism of my machine broken off in Fig. 4.

To the rear of the rock-shaft $A^1$, there is mounted in the frame A a transverse rock-shaft $A^3$, see Figs. 2, 4 and 5, which is journalled in both side plates of the machine.

Upon this transverse rock-shaft $A^3$ there is secured an arm $A^4$ upon which is pivoted a link-bar $A^5$, see Figs. 1 and 2, which extends forwardly, and is pivoted upon the wrist-pin $a$ in the lever $A^2$ by means of a slotted opening $a^1$.

From the wrist-pin $a$ to a post $a^2$ on the link-bar $A^5$ a spring $a^3$ extends, so that the strain placed upon the operating lever (not shown) is placed upon the spring $a^3$. $A^6$ indicates a full stroke ratchet of ordinary construction and operation, adapted, in association with a double acting pawl, to require a full oscillation of the transverse rock-shaft $A^3$, at each operation of the mechanism.

Upon the transverse rock-shaft $A^3$ there is secured a lever $a^4$ from which a spring $a^5$ extends to an anchor post $a^6$ which operates to turn the rock-shaft $A^3$ back to its starting point.

*Operating mechanism*

Mounted upon a transverse shaft B secured in the side plates of the machine frame A, are a plurality of lever frames $B^1$, $B^2$ and type carrier levers $B^3$. In this invention type levers $B^3$ can be arranged in spaced groups as shown in Figs. 4 and 11, all of which are mounted and oscillate upon the shaft B.

The lever frames $B^2$ correspond in number with the number of type carrier levers in each group, fitting, one within the other, and consist of the side bell-crank levers, $b$ and $b^1$, see Fig. 12, the arms thereof being connected by the cross bars $b^2$ and $b^3$. The type carrier levers $B^3$, of each group, are each provided with segmental posts $b^4$ which extend upwardly and contact with the cross-bars $b^2$ of the lever frames $B^2$.

The type carrier levers $B^3$ are each provided with springs $b^7$ which maintain the segmental posts $b^4$ on the type carrier levers B in contact with the cross-bars $b^2$ of the lever frames.

Mounted upon the shaft B are a plurality of levers C, $C^1$, $C^2$ and $C^3$, see Figs. 4 and 11, each of said levers C being integrally connected with one of said lever frames $B^2$ by means of a segmental arm $c$, as shown in Figs. 11 and 12.

Mounted upon the shaft B are bell-crank levers $B^4$, the upper arms of which are connected by a cross-bar $b^5$, which cross-bar rests upon the lever frames $B^2$, the lower arms of which levers $B^4$ are provided with rollers $b^6$, see Figs. 2, 10 and 11.

Upon the transverse rock-shaft $A^3$, a cam D is secured which engages the rollers $b^6$, and maintains the levers $B^4$ in the position shown in full lines in the drawings, and when said cam D is rotated upwardly by the operation of the machine releases said levers $B^4$ so that the several lever frames and type carrier levers can swing upwardly, as indicated by broken lines in Fig. 12, and the return movement of said cam D will operate said levers $B^4$ to move all of said levers back to their normal positions.

The levers C, etc., are each pivoted to a horizontal slide bar E, $E^1$, $E^2$, $E^3$ and $E^4$ by means of a pivot $e$, see Fig. 2, to each of which an operating spring $e^1$ is secured, which, when the cam D is moved upwardly by the rotation of the rock-shaft $A^3$, causes the slide bars E to move longitudinally toward the left, see Fig. 2, and the upper arms of the levers $B^1$ and $B^2$ to swing upwardly, thus permitting the type carrier levers $B^3$ to be swung upwardly by the springs $b^7$.

To limit the upward swing of the type carrier levers so that the required type will be raised to the printing line, lateral detent posts $e^2$ are placed on the sides of the slide bars E which as the bars slide forward, contact with a depressed key stem F, thereby stopping the oscillation of the lever C pivoted to that particular slide bar and the simultaneous swing of the lever frame $B^2$ connected to said lever C by the segment bar $c$, thereby permitting the required type lever $B^3$ to carry the required type upwardly and bringing it to rest at the printing line. This operation of the type lever takes place in each group of type levers, unless otherwise regulated as hereafter described.

*The keyboard*

The keyboard mechanism is very similar to those of several other well known machines, being provided with a plurality of rows, or columns of numbered keys, from 1 to 9. The key stems F are provided with springs $f$ to return them to their normally raised positions, and with notches $f^3$ to receive the edge of a swinging bar $F^1$ the purpose of which is to retain a depressed key, in any column, down until all the bars $F^1$ are simultaneously operated by the operation of the machine, to release the depressed keys. These bars $F^1$ also are for the purpose of releasing a depressed key when a second key in the same column is subsequently depressed. To release all of the depressed keys when the machine is operated, I provide a transversely movable slide-bar $F^2$, which is provided with shoulders $f^2$ which are adapted to engage the swinging bars $F^1$ and swing them out of the notches $f^3$ in the key stems F, and I provide lever mechanism $F^3$, adapted to be actuated by some movable part of the operating mechanism as hereinafter described. I also provide a spring $f^4$ which tends to move the blocks $f^2$ on the slide $F^2$ away from said swinging bars $F^1$ see Fig. 9. The lower ends of the key stems F are bifurcated, the arms of which are adapted to engage said detent posts $e^2$ on either side of said slide bars E, as may be necessary to enable the desired detent post to arrive at and be stopped by the depressed key stems.

*Accumulator wheel mechanism*

Figure 3:
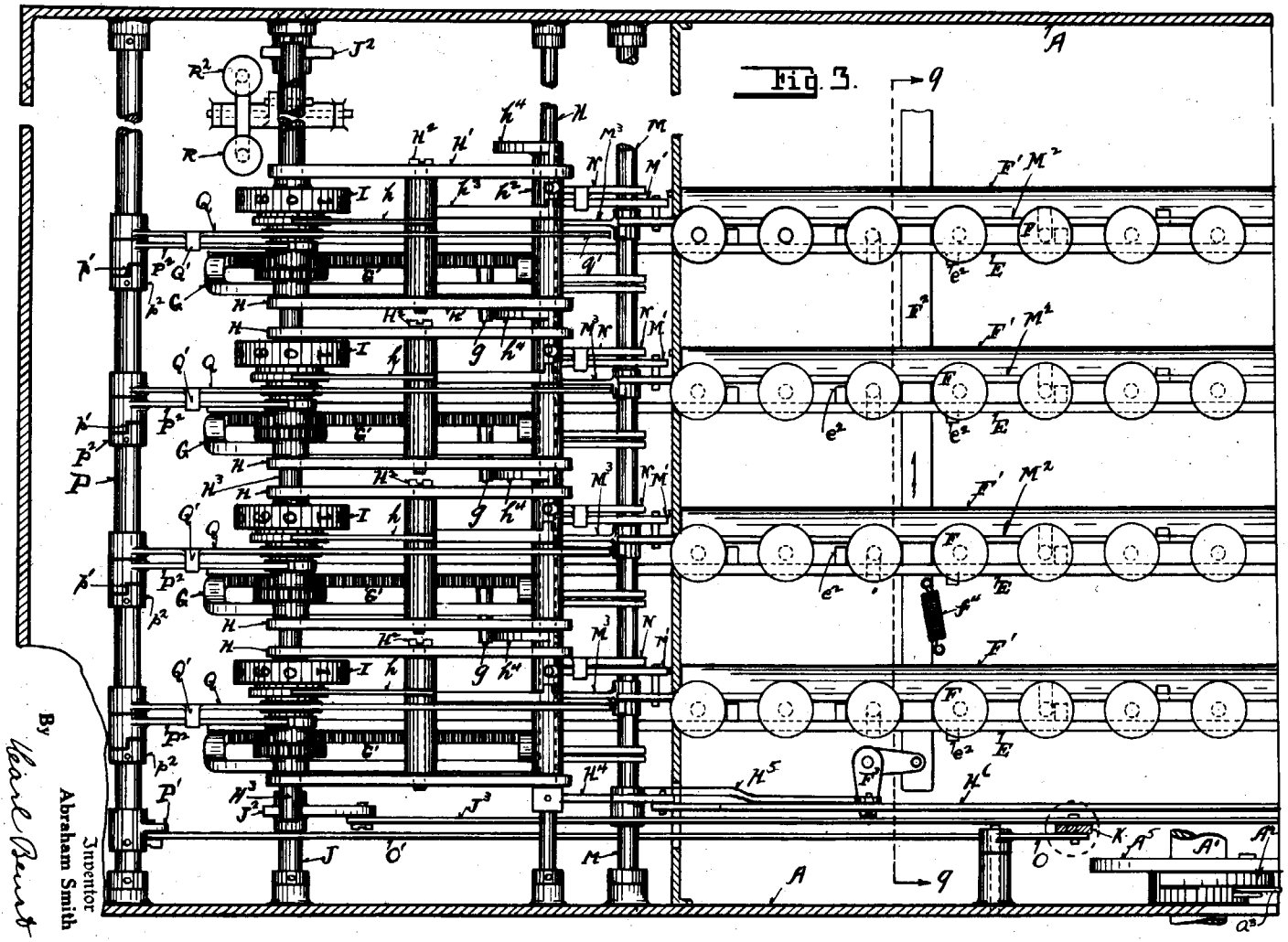

Upon the side of each of the slide-bars E, $E^1$, $E^2$ $E^3$ and $E^4$ is slidably secured a double gear rack frame G, see Figs. 1, 3 and 7, composed of a lower rack $G^1$ and an upper rack $G^2$. The upper rack $G^2$ is offset, toward the right, out of the plane of the lower rack $G^1$. $G^3$ indicates a transverse shaft slidably supported in the side plates of the machine frame, and passing transversely through the rack frames G.

Upon the shaft $G^3$, are rotatably positioned gear pinions $G^4$, which mesh with either the lower or upper racks as may be desired. The faces of said pinions $G^4$ are double the width of the face of either rack, so that as said pinions are moved laterally, as hereinafter described, so as to engage the teeth on one or the other rack, they are never out of engagement with one of said racks. These pinions $G^4$ rotate freely on the shaft $G^3$, and are held in their proper position thereon by the collars $g$ which are pinned on the shaft, so that when said shaft is caused to move longitudinally in its bearings, as hereafter described, the pinions $G^4$ are carried with it out of engagement with one rack and into engagement with the other rack.

Each of the racks $G^1$ and $G^2$ and slide-bars E have a maximum simultaneous movement represented by nine gear teeth on said racks, which movement is stopped when one of the detent posts $e^2$ engages a depressed key stem F, while the racks have a relative movement upon the slide bars E of one additional gear tooth.

This movement of the racks causes the pinion in mesh therewith to rotate an equal number of teeth.

Mounted on a transverse shaft H supported in the side plates of the machine frame, is a swinging frame composed of side bars $H^1$ which are supported on said transverse shaft H, and are intermediately connected together by a transverse screw or bolt $H^2$. There is one of these frames for each accumulator wheel. Secured in the free ends of the side bars $H^1$ is a shaft $H^3$, which is continuous and non-rotatable through all of the frames, and upon said shaft between the side-bars, $H^1$ of each frame is placed an accumulator wheel, I and its integral wheels $I^1$, $I^2$, $I^3$, and gear pinion $I^4$, see Figs. 17, 18 and 19.

The accumulator gear pinion $I^4$ intermeshes with the slidable lower gear pinion $G^4$, and its periphery is provided with ten teeth which correspond to the nine numerals and a zero represented on the periphery of the accumulator wheels. The cam $i$, on the cam wheel $I^1$, notch $i^1$ in the periphery of the wheel $I^2$, and the radial post $i^2$ in the periphery of the wheel $I^3$ being opposite the zero on the accumulator wheel I and the tenth tooth on the accumulator gear-pinion $I^4$.

Mounted in the side plates of the machine frame is a transverse rock-shaft J, see Figs. 1 and 7, upon which are non-rotatably secured cam levers $J^1$ upon which the opposite ends of the shaft $H^3$ rest, so that said shaft and the accumulator wheels and pinions $I^4$ are supported on said cam levers $J^1$ and when said cam levers $J^1$ are operated as hereafter described, the cam surfaces $J^2$ thereon will lift said shaft sufficiently for the teeth on the accumulator gear pinion to clear the teeth of the slidable pinions $G^4$.

To one of the cam levers $J^1$, see Fig. 1, a link-bar $J^3$ is pivoted, which extends rearwardly and is pivoted to a reversing plate $J^4$ see Figs. 2 and 10, by means of a pivot-post $j$ which extends into a vertical slot $j^2$ in said plate. The reversing plate $J^4$ is pivoted upon a stationary post $j^3$ secured on the side plate of the machine, see Fig. 4.

The link bar $J^3$ is provided with a longitudinal slot $j^6$, see Fig. 1, into which a post K, secured on the stem $K^1$ of the total key, projects, so that when the total key is depressed the pivot post $j$ in said link-bar is caused to move downwardly to the bottom of the vertical slot $J^2$ in the reversing plate $J^4$.

Secured upon the transverse shaft $A^3$, see Figs. 2 and 10, is a lever L, upon which a double-acting pawl $L^1$ is pivoted, which is adapted to engage a post $j^4$ at the upper end of the reversing plate $J^4$ at the downward movement of the lever L and push the link-bar $J^3$ forwardly and thus swing the cam levers J forward so as to carry the cam surfaces $J^2$ thereon under the shaft $H^3$ and raise said shaft and the accumulator gear pinions $I^4$ out of mesh with the slidable pinions $G^4$, and when the lever L reaches its lowest position, as indicated by broken lines in Fig. 10, the pawl $L^1$ engages the post $j^5$, at the lower end of the reversing plate $J^4$, and when the lever L starts its upward movement, the link-bar $J^3$ is moved in its reverse direction thus returning the cam-levers $J^1$ to the position shown by full lines in Fig. 1, with the accumulator gear pinions $I^4$ again in mesh with the slidable pinions $G^4$.

When, however, the total key $K^1$ is depressed prior to the operation of the lever L, the rear end of the link-bar $J^3$ will be moved down to the lower end of the vertical slot $j^2$ in the reversing plate $J^4$, see Fig. 10, so that the lever L and its pawl $L^1$ starts its upward movement there will be a forward thrust imparted to the link-bar $J^3$ which will cause the cam-levers $J^1$ to raise the accumulator gear-pinions $I^4$ out of mesh with the sliding pinions $G^4$.

It will be observed that the lever L, and cam D move simultaneously, and that the lever L immediately begins to cause, through the reversing plate $J^4$, the link-bar $J^3$ to push the cam-levers $J^1$ under the shaft $H^3$ so that the accumulator gear pinions $I^4$ will be out of mesh with the sliding pinions $G^4$ by the time the highest point of the cam D has passed the roller $b^6$ on the lever $B^4$ thereby permitting the levers C and slide-bar E to commence their forward movement. The slide-bars E carry the racks G, so that the racks are carried forward with the slide-bars E while the accumulator gear pinions $I^4$ are out of mesh with the sliding pinions $G^4$ and until the lever L and cam D are ready to commence their reverse upward movement, which causes the pawl $L^1$ to engage the stud-post $j^5$ on the reversing plate $J^4$ for the purpose of causing the link-bar $J^3$ to swing the cam levers $J^1$ backwardly to allow the shaft $H^3$ to lower so that the accumulator gear pinions $I^4$ will again mesh with the sliding pinions $G^4$ and be rotated thereby during the backward movement of the sliding bars E and the racks G thereon, while the cam D is causing the type-carriers to recede to their normal positions of rest.

*Printing and adding of numerals*

The movement of the slide-bar E and the rack G thereon is primarily controlled by the depressing of a key stem F; for instance if number 1 key stem F is depressed, see Fig. 1, the lower end thereof will be in the path of the first stud-post $e^2$ thereon, and the forward movement of said slide-bar E will be stopped thereby, the rack G having turned the accumulator pinion $G^4$ one tooth, and the depressing of any one of the other key stems F in the same column will operate in the same manner, the sliding pinion being turned the number of teeth corresponding to the number of the depressed keys. When the operating shaft $A^3$ is operated, the return movement of the operating shaft $A^3$ causes the accumulator gear pinions $I^4$ to drop into mesh therewith which will rotate the accumulator a corresponding number of digits during the return movement of the slide-bar E and rack-bar G.

*The carry over mechanism*

Mounted upon the transverse bolt $H^2$, which secures the side frames $H^1$ together, is a lever $h$ see Figs. 1, 3 and 19, which is adapted to ride upon the periphery of the cam wheel $I^1$, and be operated by the cam surface, $i$, thereon. This lever $h$ is provided with a hook, $h^1$, see Fig. 19.

Mounted on the supporting shaft H and passing through the rear ends of the frames $H^1$ is a sleeve $h^2$, by which a lever $h^3$ is non-rotatably secured, said lever $h^3$ being adapted to engage the hook $h^1$, by which it is normally held in a raised position, until the lever $h$ is operated by the cam $i$, as hereinafter described. The sleeve $h^2$ is provided with a downwardly extending arm $h^4$ which is adapted to engage a post, $g$, on the next rack to the left, which normally holds the rack G in its most forward position, but when the lever $h$ is operated by the cam $i$, to release the lever $h^3$, the rack-spring $g^1$, see Figs. 1 and 16 causes the next rack G to the left, to move backward one unit, which thereby through its sliding pinion $G^4$ and the accumulator pinions $I^4$, causes the accumulator wheel of the next order to rotate one unit forward.

In order to raise the lever $h^3$ back and into engagement again with the hook $h^1$ as shown by broken lines in Fig. 1, and thereby cause the lever $h^4$ to press against the stud-post $g$, on the rack G and force the rack to return to its normal relative position on the slide bar E, a lever $H^4$, see Figs. 1 and 3, is secured on the supporting shaft H, the free end of which lever is provided with a link-bar $H^5$ which is secured to a link-bar $H^6$ extending rearwardly to an eccentric pivot $d$ on the cam D, so that when said cam D returns to its normally raised position, as shown in Figs. 2 and 10, the racks G etc., will be returned to their relative normal position on the slide-bars E as shown by full lines in Figs. 1 and 16.

*Zero controlling and printing mechanism*

Mounted upon a transverse supporting shaft M are a plurality of bell-crank lever frames $M^1$, one arm of each of which is pivoted to slide-bars $M^2$. Mounted on said shaft M and enclosing each of said bell-crank lever frames $M^1$, are outer frames N, there being a pair of these frames upon said shaft M for each row of keys F.

Beginning at the left hand, each outer frame N is provided with an arm $N^1$ which under-laps the next adjacent outer frame N toward the right. The inner bell-crank lever frames are provided with a slot, *n*, into which a post, *m*, secured in the outer frame projects, said slot being of a length equal to one unit, so that when the inner bell-crank lever frame is raised upwardly, as hereinafter described, the post *m* will raise the outer frame.

Upon the shaft M, an arm $M^3$, see Fig. 16, is secured which, when the shaft M is rotated as hereinafter described, will swing the frames $M^1$ and N upward to their normal raised position, and cause the slide bars $M^2$ to move backwardly for the purpose hereinafter described.

The slide-bars E, each, have a post $e^3$, see Figs. 1, 14, 15 and 16, and the slidable racks G on said bars are each also provided with a post $g^1$ which is adjacent to the post $e^3$ on the slide-bar E, and in vertical relation, so that said posts constitute two units of space, and are under the inner frames $M^1$. The inner frames $M^1$ are each provided with a projection $m^1$, the lower extremities of which are one unit of distance above the upper post $g^1$ on the rack G, so that there are a total of three units of distance for the inner frame $M^1$ and its projection $m^1$ to swing in order to engage the post $e^3$ on the slide bar E. Now when a numeral key in the first column of keys at the right is depressed, and the machine is operated, the link bar $H^6$ is moved forward, which releases the lever $M^3$ which allows the spring $m^2$ to draw the slide-bar $M^2$ forward a distance equal to one unit which movement is limited by the post $f^1$ engaging the slot in the slide $M^2$, and projection $m^1$ on the inner frame M at the right, corresponding with the row of keys in which a key has been depressed swings downward, one unit, but does not engage either of the posts $e^3$ and $g^1$ on the slide-bar, and rack of that order.

To the left of the depressed key, all of the slides $M^2$ are free to slide forward to the limit of their movement, so that all of the lever frames and outer frames $M^1$ and N swing downward all of three units and engage both posts $e^3$ and $g^1$, thus preventing the slide bars E at the left of the depressed key from moving forward and thus avoiding the upward movement of the type carrier, so that no zeros will be printed at the left of the numeral.

If a numeral at the left is depressed, the slide $M^2$ at the left will likewise move forward one unit, thus allowing the inner and outer frames at the left to swing down one unit of space, but not to engage the posts $e^3$ and $g^1$, so that the slide bar at the left is free to move forward far enough to print the number desired, while the succeeding outer frames N toward the right will likewise be permited to swing downward by the underlapping arms $N^1$ and inner bell-crank frames $M^1$ to swing downward one unit in unison and the inner bell-crank lever frames, by reason of the slots *n* and post *m*, see Fig. 16, will drop one additional unit so that the projection $M^1$ will engage the post $g^1$ on the rack G thus permitting a movement of one unit of the slide-bars to the right of the depressed key which will cause all of the type carriers to the right to swing upward one unit and raise the zero type to the printing line.

When the operating mechanism is returned to its normal position, the rearward movement of the link-bar $H^6$ causes the arm $M^3$ to swing the lever frames $M^1$ and N upward thus forcing the slides $M^2$ backward and releasing the depressed key.

When the link-bar is moved backward by the return movement of the operating mechanism the arm $h^6$ on the link-bar $H^6$ engages the bell-crank lever $F^3$, see Fig. 3, and moves the slide $F^2$, see Fig. 9, to the left thus disengaging the ratchet bars from the key stems F and releasing all depressed keys.

*Total printing mechanism*

When it is desired to print the accumulator total, as indicated by the accumulator wheels, the pinions $G^4$ must be in their adding position, intermeshing with the lower rack-teeth $G^1$ see Figs. 1 and 7.

The total key $K^1$, is depressed which moves the rear end of the link-bar $J^3$ downward so that the stud post *j* will be in the lower end of the vertical slot in the reversing plate $J^4$, see Figs. 2 and 10. The lower end of said vertical slot, being curved forwardly, as shown in said figures, causes the upper end of said reversing plate to swing forward sufficiently to release the lever pawl $L^1$ on the lever L.

Pivoted to the total key stem $K^1$ is a bell-crank lever O see Fig. 1. The opposite arm of the lever O has pivoted thereto a link $O^1$, the forward end of which is provided with a slotted opening $O^2$.

Secured upon a transverse rock shaft, P, is a lever $P^1$, the lower end of which is provided with a pivot post, *p*, which engages the slotted opening $O^2$ in said link-bar $O^1$.

Rotatably mounted on the rock-shaft, P, are zero-stop levers $P^2$ adapted to engage the radial zero-post $i^2$ on the periphery of the wheel $I^3$. There is a stop-lever $P^2$ for each accumulator wheel mechanism as shown in Fig. 3.

The hubs of these zero stop levers $P^2$ are provided with shoulders $p^1$, see Fig. 3, and non-rotatably secured on the rock-shaft P, are collars $p^2$ having shoulders adapted to engage the shoulders $p^1$ on the hub of the lever $P^2$ and raise the same upward.

Rotatably mounted upon the shaft P beside each of the levers $P^2$, is a zero controlling lever Q, which is provided with a laterally projecting ear or lug $Q^1$ which overlaps the lever $P^2$, so that the lever Q will be lifted by the lever $P^2$ as hereafter described.

The levers Q are provided with studs *q* adapted to enter the zero notch, $i^1$ in the wheels $I^2$, when said notches are on the upper axial line at the moment said lever Q is lowered as hereinafter described.

After an addition or series of additions have been made as hereinbefore described, and the total has been accumulated on the accumulator wheels, the series of radial posts, $i^2$, and notches $i^1$ on the several accumulators will be distributed at different points of their travel around their axes, and it is desired to print said total, the depressing of the total key $K^1$, operates, through the levers and rockshaft P, hereinbefore described, to lower the levers $P^2$ and Q upon the wheels $I^2$ and $I^3$ of the accumulator wheel mechanism.

If the post $q$ on the lever Q drops into a notch $i^1$, on one of the accumulator wheel mechanisms, the free end $q^1$ of said lever Q will fall below the laterally extending post $m^3$ on the slide-bars $M^2$, so that said slide bars can move forward to the limit of their movement, and allow the bell-crank lever frames $M^1$, and outer frames N connected to such slide-bars $M^2$ to fall enough to engage both posts $e^3$ and $g^1$ on the racks G and slide-bars E and prevent their forward movement and the consequent raising of the zero type to the printing line. If, however, the post $q$ on any of the levers Q, drops upon the peripheries of any of the wheels $I^2$, see Fig. 18, the free ends $q^1$ of such levers Q only drop far enough so that the posts $m^3$ on the slide-bars $M^2$ will engage the notch $q^2$ in said lever, and thereby stop the forward movement of such slide-bars $M^2$ at a distance of one unit, thereby allowing the bell-crank lever frames $M^1$ connected therewith to swing downward one unit, but not far enough to engage the posts $e^3$ and $g^1$ on the racks G and slide-bars E so that the type carriers will raise a numeral to the printing line, the same as if keys F were depressed.

When the operating mechanism is operated the slide-bars E and racks G thereon, not engaged by the bell-crank lever frames $M^2$ will move forward, and because the gear pinions $G^4$ and $I^4$ are left in mesh, not having been disengaged by the action of the lever L and pawl $L^1$ during their downward movement, the accumulator mechanism will be rotated backward until the radial posts, $i^2$ on the wheels $I^3$ are stopped by the zero levers $P^2$, which will cause the type carriers $B^3$ to raise the required type a distance equal to the number of gear teeth $G^1$ on the racks G travelled by said racks until stopped by the joint action of said radial posts $i^2$ and zero levers $P^2$, and said total will be printed in the usual manner, and the total key being held down, the return upward movement of the lever L and pawl $L^1$ will force the lower end of the reversing plate $J^4$ forward, which through the link-bar $J^3$ will disengage the pinions $G^4$ and $I^4$ leaving the accumulator wheels standing at zero.

*Sub-totals*

When a sub-total is required, before the lever L and pawl $L^1$ are allowed to start their return upward movement, the total key $K^1$ is released, thus allowing the link-bar $J^3$ and its stud post to return to the upper end of the slot in the reversing plate $J^4$, which release of the total key $K^1$ will at the same time again raise the zero lever $P^1$ and lever Q off of the wheels $I^2$ and $I^3$. In this case the gear pinions, not being released, the accumulator wheels will again be returned to their positions before a total is printed, upon the return upward movement of the lever L and pawl $L^1$. Thus a total is obtained by pressing down the total key and holding it down during the entire movement of the operating mechanism, and a sub-total is obtained by holding down the total key during the first half of the operation of the operating mechanism, and releasing said key before the commencement of the second half of said operation.

*Subtraction*

When it is desired to subtract an amount from an amount previously accumulated, a subtraction key R is depressed, which through a bell-crank lever mechanism $R^1$ causes the supporting shaft $G^3$ to move longitudinally toward the right, which carries the pinions $G^4$ to the right, so that they will slide out of mesh with the upper rack, as shown in Fig. 8, so that the forward movement of the slide-bars E and racks G thereon will turn the accumulator wheels operated, backward a number of teeth equal to the number to be subtracted. The addition key $R^2$ is then depressed which slides the shaft $G^3$ and gear pinions $G^4$ thereon back to the position shown in Fig. 7, in adding position.

*Column selective mechanism*

Each of the several groups of type carriers $B^3$ represents separate columns in which items are to be printed, the total of all the items printed in the several columns being shown on the accumulator wheels. In these drawings I have shown four groups of type carriers $B^3$, but it will be obvious that, by means of the mechanism I have shown, and described, any number of groups of type carriers can be used as may be desired.

It is necessary that mechanism be provided by means of which a selection of group of type carriers $B^3$, desired to be used to print in the desired column can be made.

For this purpose I have provided on the type carrier hooks S, see Fig. 10, which are adapted to be engaged by spring-pressed hook levers $S^1$ said levers $S^1$, each being broad enough to engage the hooks, S, on each type carrier $B^3$ of an entire group, so that the groups, not in use, will be retained in their lowermost positions.

To release a single group of type carriers, I have provided a cam shaft T, upon which are secured cams $T^1$, $T^2$, $T^3$, and $T^4$, there being a cam for each hook-lever $S^1$. A quarter rotation of the cam-shaft T will cause one of the lever-hooks to release a lever $S^1$ from the hooks S on the type carriers $B^3$ of one group, and allow the spring-pressed hook levers $S^1$ to engage the hooks S on all of the other type carriers, so that only one group of type carriers will operate at a time.

Figure 6:
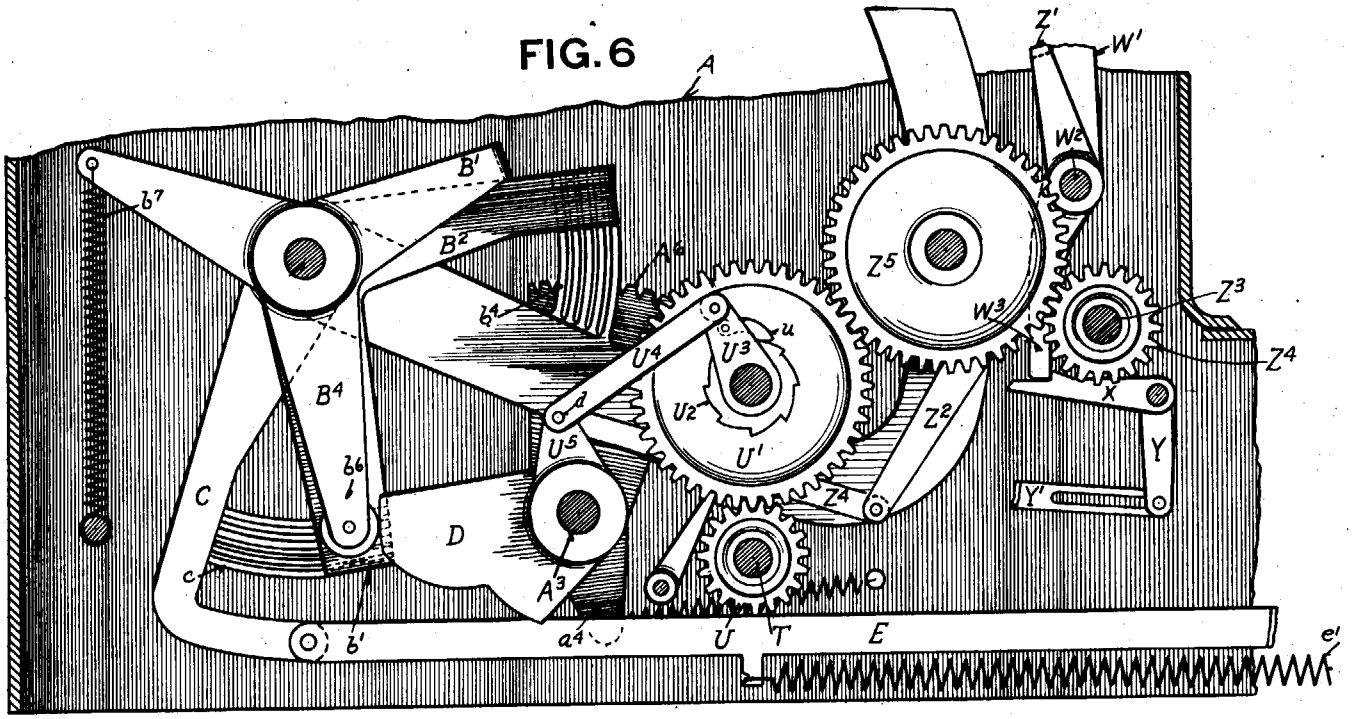
Figure 6 is a sectional elevation of the same on the line 6—6 in Fig. 5, looking in the direction of the arrows.

To operate the cam-shaft T, I secure thereon a spur-gear U, see Figs. 2, 5 and 6. Intermeshing with the spur-gear U, is another spur-gear $U^1$, which has upon the hub thereof a ratchet wheel, adapted to be engaged and operated by a ratchet lever $U^3$, see Fig. 6, having pivoted thereon a ratchet dog $u$.

To the free end of the ratchet lever $U^3$ is pivoted a link-bar $U^4$ which is connected to an arm $U^5$ secured on the rock-shaft $A^3$, so that each operation of said rock-shaft will rotate the spur-gear $U^1$ one tooth of said ratchet $U^2$. The spur-gear $U^1$ is of such diameter, that a single movement of said spur-gear $U^1$ will cause the spur-gear U on the cam shaft T to rotate a quarter turn and release one group of type carriers and secure all the other groups against operation, so that at the next operation of the mechanism the type carriers $B^3$ will be ready to print in the next column.

In order to provide means by which the selective mechanism can be manually operated, when desired, I provide, on the left-hand of the machine a disc V, and thumb knob $V^1$ which is non-rotatably secured on the shaft T of the spur-gear U, said disc V being provided with peripheral notches $v$, see Fig. $9^A$, corresponding with the positions of the cams on the cam-shaft T, and engaging the notches $v$ is a stop lever $V^2$, so that by means of the thumb knob $V^1$ the cam-shaft T can be rotated backwardly, as far as may be desired.

*Hammer mechanism*

Each type carrier $B^3$ is provided with ten spring pressed type, 0, 1, 2, 3, 4, 5, 6, 7, 8, and 9 of usual and well known construction, so that further description thereof is unnecessary. In addition to the type above mentioned, each type carrier is provided with a spring pressed type-dummy W for the purpose hereafter described.

For striking the type carried by the carriers $B^3$, I provide a hammer $W^1$, one for each group of type carriers, in these drawings four in number as shown in Fig. 4.

Each hammer $W^1$ is adapted to strike all of the type carried to the printing line by the carriers of each group. When one or more of the carriers of a group are not raised, by reason of the elimination of the printing of zeros at the left of numerals, as hereinbefore described, the hammer $W^1$ will strike the spring pressed dummy W, so that said hammer will always strike the full number of type, so that the stroke of the hammer will never be delivered upon one type alone, as there will always be the equivalent of five type to receive the force of the hammer.

When the hammers $W^1$ strike the positioned type, the latter are driven radially against a rotatable platen 15 carried by cross shaft 16 (Figs. 2 and 4). The platen 15 and its shaft 16 may be supported by any suitable means, in the position shown in Fig. 4, so as to be in proper position to serve the four groups of type carriers. Suitable feeding rollers may be provided to cooperate with the platen 15 so as to hold a sheet or strip of record material in the proper position on the platen 15 and to enable the line by line feeding of the paper by the rotation of the platen 15. Such details of construction as the feeding rollers and the paper supporting table for cooperating with the platen of the type shown herein are well known in the adding machine and typewriter art and are not disclosed herein, as they form no part of the present invention, but merely serve, in their usual manner, to cooperate with the platen 15 to hold and feed a record material.

The step by step rotation of the platen 15 to provide a step by step feed of the record material is accomplished through the medium of a ratchet 17 (Fig. 2) fast on the shaft 16. Cooperating with the ratchet 17 is a ratchet pawl 18 pivotally mounted on an arm 19 which, in turn, is pivoted on the shaft 16 and is operatively connected by a link 20 to the member D, which, as it will be remembered, is given a reciprocation at each operation of the machine. In this manner, at each operation of the machine, the platen 15 will be given a partial rotation to the extent of one tooth of the ratchet 17, so as to bring a new space on the record material to the printing line.

A ribbon 21 (Fig. 4) may be interposed between the type and the record material at the printing line, so as to cause an inked impression of the character to be printed on the record material. The ribbon 21 may be mounted in the manner shown in Fig. 4, where it passes from one ribbon spool to another across the face of the platen 15 and is guided intermediate the groups of type carriers by the guide rollers 22. Ink ribbon mechanisms and means for advancing ink ribbons of this character are old and well known in the art and the details thereof are not disclosed herein, as they form no part of the present invention, and any well known form of ink ribbon mechanism may be employed in the machine disclosed herein.

The hammers $W^1$ are pivoted upon a shaft $W^2$, and are each provided with an operating lever $W^3$ to which a spring $W^4$ is attached, which will cause the hammer to strike when the lever $W^3$ is released.

To retain the hammer $W^1$ in a backward position as shown in Figs. 2 and 10, I provide a latch lever X, there being a latch lever for each hammer. The latch levers are secured upon a rock-shaft $X^1$. Also secured upon said rock-shaft is a lever Y to which is pivoted a link-bar $Y^1$ by means of a slotted opening $y$, the opposite end of said link-bar $Y^1$ being pivoted on the eccentric pivot $d$ see Fig. 10, so that just before the rock-shaft $A^3$ reaches the limit of the first half of its movement, after the released type carriers have carried the desired type to the printing-line, the hammers will be released.

Adjacent to each outside hammer W there is a hammer draw-back lever Z having a bar $Z^1$, see Figs. 4 and 5, which engages the stems of the hammers, for the purpose of forcing them away from the type after the stroke has been delivered. These draw back levers are provided with arms $Z^2$, to which link bars $Z^4$ are pivoted which are also connected to the eccentric pivots $d$, see Figs. 6 and 10, so that during the first half of the movement of the rock-shaft $A^3$ the bar $Z^1$ will be moved away from the hammer stems, and during the return movement of the rock-shaft, the bar $Z^1$ will force such hammers, as made the stroke, back into position to be engaged by the latch X.

I have also provided a cam-shaft $Z^3$ which will be rotated a quarter turn, at each movement of the rock-shaft $A^3$, by the spur-gears $Z^4$ and $Z^5$, which last spur-gear intermeshes with the spur-gear $U^1$, so that the cams $z$ on the cam-shaft $Z^3$ will engage any hammer lever $W^3$ and assist in returning the released hammer to latched position as indicated in Figs. 2 and 10.

From the foregoing description of the construction and operation of the several groups of mechanism, it will be obvious to those skilled in the art that, the accumulator mechanism of my invention can be used in several types of adding machines, and also that, column printing mechanism as shown and described by me, can be used in several types of such machines.

And further it will be obvious that many modifications can be made in the construction and arrangement of the mechanism herein shown and described without departing from the scope of my invention.

What is claimed is:

1. The combination with type carrier levers arranged in groups, of movable bars positioned transversely of said levers, a type carrier lever corresponding to each movable bar, and means to cause said bars and type carrier levers to oscillate.

2. An oscillating spring pressed type carrier, an oscillating key controlled spring pressed transverse bar adapted to control the oscillation of said type carrier, and a cam controlled oscillatory transverse bar adapted to return said type carrier and the first mentioned transverse bar to their normal position.

3. The combination of type carriers arranged in groups, an oscillating key-controlled transverse bar adapted to control the oscillation of each particular type carrier in a single group, and operating means for permitting and arresting the movement of said type carrier, and corresponding transverse bars.

4. The combination with a plurality of groups of type carriers, movable bars extending transversely of all said groups, means for oscillating each group by the same movable bars, and means to limit the movements of said movable bars.

5. A plurality of oscillatory type carriers, a plurality of key controlled transverse bars adapted to limit the oscillations of said type carriers, and a cam controlled transverse bar adapted to engage the first mentioned transverse bars and return them to their normal positions, all of said type carriers and transverse bars being mounted on a common axis.

6. A plurality of type carriers, arranged in spaced groups, a plurality of oscillatory transverse bars extending across all of said groups, a plurality of key controlled mechanisms connected to each of said transverse bars, a cam controlled transverse oscillatory bar extending across said first mentioned transverse bars, adapted to return said type carriers to their normal positions, and selective mechanism adapted to retain the type carriers of some of said groups in their normal positions.

7. A plurality of type carriers, a spring pressed dummy type stem in each of said type carriers and a single hammer adapted to strike each of said dummy type stems when said type carriers are in their normal position.

8. A plurality of type carriers arranged in spaced groups, a hook on each of said type carriers, a lever hook adapted to normally engage the hooks on all of the type carriers of each group, and cam mechanism adapted to operate one of said lever hooks at a time to release the group of type carriers desired.

9. A plurality of type carriers arranged in spaced groups, a spring actuated hook lever for each of said groups, a hook on each of said type carriers adapted to be engaged by said hook-levers, a transverse cam shaft and a plurality of cams on said shaft and adapted, when rotated, to operate one of said hook levers to release one of said groups of type carriers.

10. A transverse shaft, a plurality of type carriers mounted on said shaft, a plurality of bell-crank lever frames, one enclosing the other and all mounted on said transverse shaft, an upright arm on each of said type carriers adapted to contact with each of said bell-crank lever frames, a plurality of longitudinally slidable key controlled bars, a lever pivoted to each of said key controlled bars and mounted upon said transverse shaft, and an arm secured to each of said levers and to each of said bell-crank lever frames.

11. A plurality of type carriers arranged in spaced groups, key controlled mechanism adapted to cause said type carriers to carry type to the printing line, hooks on said type carriers, hook levers adapted to engage the hooks on said type carriers to retain said groups of type carriers, and cam and gear mechanism adapted to release a desired group of type carriers to the action of said key controlled mechanism.

12. In a machine of the class described, the combination of a plurality of groups of type carriers arranged to print in separate columns on record material, means to print numerals by any group in its respective column including means for supporting said record material in fixed lateral relationship to said groups of type carriers for a series of successive operations of the machine, key mechanism to control the printing of numerals, means for moving said type carriers variable distances under control of said key mechanism, selectively operable restraining means for each group of type carriers for holding the same against movement, and automatic means acting through the medium of said restraining means to select in predetermined sequence the group of type carriers to be operated at each operation of the machine.

13. In a machine of the class described, the combination of a plurality of groups of type carriers arranged to print in separate columns on record material, means to print numerals by any group in its respective column including means for supporting said record material in fixed lateral relationship to said groups of type carriers for a series of successive operations of the machine, key mechanism to control the printing of numerals, means for adjusting said type carriers under control of said key mechanism, selectively operable restraining means for each group of type carriers, and means automatically actuated at one operation of the machine and acting through the medium of said restraining means to select the group of type carriers to be adjusted at the next operation of the machine.

14. In a machine of the class described, the combination of a plurality of groups of type carriers arranged to print in separate columns on record material, means to print numerals by any group in its respective column including means for supporting said record material in fixed lateral relationship to said groups of type carriers for a series of successive operations of the machine, mechanism to control the printing of numerals, means normally effective and operable to move all of said type carriers simultaneously to set up numerals, and automatically operable means for selectively preventing the operation of certain of said type carriers by their moving means whereby selective column printing may be obtained.

15. In a bookkeeping machine, the combination of a plurality of groups of type carriers arranged to print in separate columns on record material, printing mechanism cooperating therewith including means for supporting said record material in fixed lateral relationship to said groups of type carriers for a series of successive operations of the machine, mechanism to control the positioning of said type carriers, means normally effective and operable to position all of said type carriers simultaneously, and means automatically operable to select in predetermined sequence the group of type carriers to be positioned at each operation of the machine.

16. In a bookkeeping machine, the combination of actuating mechanism therefor, a plurality of groups of type carriers arranged to print in separate columns on record material, printing mechanism cooperating therewith including means for supporting said record material in fixed lateral relationship to said groups of type carriers for a series of successive operations of the machine, key mechanism to control the positioning of said type carriers, means normally operable and effective to move all of said type carriers simultaneously under the control of said key mechanism, and automatically operable means for selectively preventing the operation of certain of said type carriers by said moving means at each operation of the machine whereby selective column printing may be obtained.

17. In a bookkeeping machine, the combination of a plurality of groups of type carriers arranged to print in separate columns on record material, printing mechanism cooperating therewith including means for supporting said record material in fixed lateral relationship to said groups of type carriers, key mechanism to control the movement of said type carriers to printing position, means normally operable and effective to move all of said type carriers simultaneously under the control of said key mechanism, and automatically operable means for selectively preventing the operation of certain of said type carriers by said moving means whereby selective column printing in a predetermined sequence may be obtained.

ABRAHAM SMITH.